Patented July 27, 1948

2,445,931

UNITED STATES PATENT OFFICE 2,445,931

PROCESS OF EXTRACTION FROM VEGETABLE MATERIALS

Arthur C. Beckel, Peoria, Paul A. Belter, Pekin, and Allan K. Smith, Peoria, Ill., assignors to the United States of America as represented by the Secretary of Agriculture No Drawing. Application May 24, 1946,
Serial No. 672,044

6 Claims. (Cl. 260—412.4)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America, for governmental purposes without the payment to us of any royalty thereon.

This invention relates to an improvement in processes of extracting fatty oils and waxy solids from vegetable materials, such as the seeds and nutmeats group comprising soybeans, cottonseed, flaxseed, peanuts, tung nuts, babassu meats, coconut meats, oiticica seed, wheat germ, corn germ, rapeseed, and sunflower seed, and to new products derived therefrom. In particular, it is directed to a process of extracting the oils with a lower alcohol, specifically ethyl alcohol, and the refining of the alcohol by cooling to a temperature sufficiently low to cause not only the oil to separate from the alcohol, but also a solid waxy product. This cooling step permits repeated re-use of the alcohol to extract fresh batches of vegetable material and avoids the necessity for a distillation step.

An object of this invention is a process for refining the alcohol solvent characterized, in that the continuous re-use of the alcohol does not result in building up the content of soluble impurities therein to an extent that would impair its efficiency. It is consequently unnecessary to resort to the measures employed in the prior art to restore the efficiency of the solvent. In other processes, exemplified by that described in United States Patent 2,377,975, it is necessary to bleed some of the solvent and replace it by fresh solvent because of the building-up of soluble impurities in the alcohol upon re-use.

A further object of this invention is to reduce the energy costs substantially and to decrease the loss of solvent.

In other processes heretofore described, involving cooling the alcohol extract to separate the oil, a distillation step subsequent thereto has been generally required to remove other substances dissolved in the alcohol. In the prior art, this removal is effected at a temperature only slightly below 30° C. As described in Example 1 of United States Patent No. 1,892,366 to Sato, "the extracted liquor is then cooled to a temperature below 30° C., whereupon the oil alone will separate out, whereas coloring matter, sugar, lecithin, and other impurities will remain in the alcohol so that colorless bean oil of superior quality is obtained."
In British Patent No. 336,274, page 2, line 33, the example specifies temperatures "between 25° and 30° C." These patents point out that oil alone separates, whereas the lecithin, carbohydrates, coloring matter, and so forth, remain in the alcohol. The same inventor, in said Patent No. 336,274, which was filed in Great Britain 10 days prior to the above-mentioned United States patent, states that "At the last cycle of the operation (when the originating material is exhausted) the liquor extract is drawn off by way of the pipe 20 into a suitable still to recover such small quantity of fatty oil as may remain therein." It is thus clear that the prior art practice embraces the removal of the alcohol solvent by distillation from dissolved lecithin, carbohydrates, coloring matter, and so forth.

We have discovered that changes can be induced in the remain alcoholic solution of the lecithin, carbohydrates, saponins, coloring matter, and so forth, which exist in solution largely in the form of glucosides and other complex and loosely bound systems, such that a solid material separates which can be removed by centrifugation, decantation, or any other of the usual methods. These changes are somewhat irreversibly brought about by refrigeration. On standing, the substances do not redissolve in the alcoholic solution from which they came, even at elevated temperatures. We have been able, by means of this discovery, to provide a process whereby the dissolved substances, remaining in the alcoholic solution, may be reduced to a small percentage depending on the degree of refrigeration. Using our process, the alcoholic solution may be repeatedly re-used on subsequent batches of oil-bearing material without recourse to other methods of refining. In practice, we have re-used one alcoholic solution 15 times with the results presented in Table I. The recirculation has been extended to 60 times with substantially identical results.

Table I

| Number of soybean extractions | Per cent solubles remaining in the alcohol after refining |
|---|---|
| 1 | 2.0 |
| 2 | 2.8 |
| 3 | 3.4 |
| 4 | 3.3 |
| 5 | 3.6 |
| 6 | 3.7 |
| 7 | 3.9 |
| 8 | 4.0 |
| 9 | 4.1 |
| 10 | 1 3.7 |
| 11 | 4.0 |
| 12 | 4.2 |
| 13 | 4.3 |
| 14 | 4.2 |
| 15 | 4.3 |

[1] Addition of 1 percent gasoline as a denaturant for the alcohol for tax purposes.

The mechanics of extraction are such that when a solvent has been re-used a number of times equal to the reciprocal of the fraction of the solvent quantity retained by the extracted material, then the concentration of dissolved materials remains constant. This value is dependent on the ratio of solvent to solid, and in our case it is achieved by 15 repetitions. The table shows a very low constant concentration of dissolved material. It is, in fact, about equal to that which we have obtained by a single extraction using absolute alcohol.

The following are examples of the manner in which our invention may be practiced:

Example I

The alcohol solution remaining after separating the vegetable oil and containing the dissolved lecithin, carbohydrates, coloring matter, and so forth, is cooled until the temperature of the solution is 0° C., or less. Gentle stirring causes the separated solid to agglomerate, whence the separation of solid and liquid is facilitated. After removal of the liquid, the solid is warmed. Liquid which was occluded when the solid agglomerated, or was present as an emulsion, is thus freed and may be poured from the compact waxy solid remaining. The waxy solid is characterized as the product of alcohol extraction and by the invariable presence of phosphorous in combined form in quantities varying from 0.2 percent to 2.0 percent, and carbohydrates in quantities varying from 10.0 percent to 30.0 percent, depending on the source. The removed occluded liquid may be combined with the alcoholic solution.

Example II

The alcohol solution remaining after separating vegetable oil and containing the dissolved lecithin, carbohydrates, coloring matter, and so forth, is cooled until the temperature of the solution is 20° C., or somewhat less. Gentle stirring causes the separated solid to agglomerate, whence the separation of solid and liquid is facilitated. After removal of the liquid, the solid is warmed, and liquid which was occluded when the solid agglomerated or was present as an emulsion, is freed and may be poured from the compact, waxy solid remaining. The waxy solid is characterized as the product of alcohol extraction and by the invariable presence of phosphorous in combined form in quantities varying from 0.2 percent to 2.0 percent, and carbohydrates in quantities varying from 10.0 percent to 30.0 percent depending on the source.

Example III

An instance of the complete procedure we use for fatty oil extraction, including one form of our new and improved process for refining the ethyl alcholic fatty oil solvent, which process has permitted the re-use of that alcholic solvent 60 times without impairing the solvent properties, follows: Cleaned soybeans, with or without hulls, are cracked and flaked, after having the moisture adjusted to about 12 percent, by passing through smooth rolls so adjusted that the emerging flakes have a thickness of about 0.008 of an inch. These flakes, dried to below 3 percent moisture, are fed into a continuously operating extractor at such a rate that the flakes are in contact for about one hour with boiling alcoholic solvent flowing in a counter-current direction. The flakes pass out of the extractor into a heated unit so arranged that substantialy all of the excess alcohol is vaporized from their surface and is condensed and returned to the extractor. The boiling alcoholic solvent, flowing counter-currently to the flakes, dissolves the oil and other alcohol-soluble materials such as phosphatides, sterols, sterol glucosides, saponins, sucrose, stachyose, free fatty acids, coloring matter, and certain unidentified materials, and is removed from the extractor near the point of introduction of the unextracted flakes. When this hot alcholic solution is cooled, soybean oil separates and may be seen falling to the bottom of the container in relatively large droplets.

It is immediately following this point in the process that our discovery was made and where our process differs entirely from that stated by Sato in Example I of United States Patent 1,892,366, "The extracted liquor is then cooled to a temperature below 30° C., whereupon the oil alone will separate out, whereas coloring matter, sugar, lecithin, and other impurities will remain in the alcohol so that colorless bean oil of superior quality is obtained." Our discovery is that on cooling to below 20° C., it is not oil alone which separates, but, following the oil, a solid matter containing lecithin, carbohydrates, sterols, coloring matter and other impurities.

Utilizing our discovery of the separation of solid matter on cooling below 20° C., we cool the alcoholic extract below 20° C. so that both oil and solids separate and then separate the supernatant alcoholic solution from the separated oil and solid. The solid is freed from occluded liquid and emulsion by warming, whereupon a compact, waxy solid remains, along with an alcoholic phase and an oil phase. As shown in Table I, the total soluble material remaining in the alcoholic solvent becomes constant at about 4.3 percent when that alcoholic solvent is repeatedly recirculated through fresh batches of soybean material and refined by our process each time. This repeated recirculation through fresh batches of soybean material is entirely different from Sato's process, since his recirculation was through the same batch of soybean material until the oil was removed, after which he resorted to distillation for recovery of his solid materials and for the restoration of his oil-dissolving property.

While the above three examples were applied to soybean extraction, our process is applicable to other members of the class of vegetable materials having alcohol-soluble fatty oils, described above.

In the process of Example III, the alcoholic extract, containing the oil and the lecithin carbohydrates, sterols, and coloring matter, may be cooled to below about 50° or 30° C. to cause the oil to separate, but not so low as to cause substantial separation of solids, the oil being then removed from the alcohol by decanting, and the alcohol subjected to further cooling to or below 20° C. or 0° C., to cause the separation of solids.

Having thus described our invention, we claim:

1. A continuous process of extracting alcohol-soluble oils from a material of the group consisting of vegetable seeds and nutmeats, comprising subjecting the said material to extraction with hot ethyl alcohol; withdrawing the alcoholic solution; cooling the latter to a temperature that is not above about 20° C. to cause the separation of oil and solids; and separating the alcoholic solution from the oil and solids and re-using the said alcoholic solution, without subjecting the latter to distillation refinement, to extract a fresh batch of said material.

2. The process of claim 1, in which the temperature is not above about 0° C.

3. The process of claim 1, in which the material is soybean material.

4. The process of claim 1, in which the material is soybean material and the cooling temperature is not above about 0° C.

5. The process of claim 1, in which the material is soybean material and in which the solids are separated from the oil and warmed to free liquids therefrom.

6. A process of extracting alcohol-soluble oils and phosphatidic solids from a material of the group consisting of vegetable seeds and nutmeats, comprising subjecting the said material to extraction with hot ethyl alcohol; withdrawing the alcoholic extract; cooling the latter to a temperature sufficiently low to cause separation of the oil but not so low as to cause any substantial separation of solids; removing the oil from the alcohol; further cooling the alcohol to a temperature not above about 20° C. to cause separation of a phosphatidic solid from the alcohol, and re-using the latter alcohol, without subjecting the alcohol to distillation refinement, to extract another fresh batch of said material.

ARTHUR C. BECKEL.
PAUL A. BELTER.
ALLAN K. SMITH.

REFERENCES CITED

The following references are of record in the file of this patent:

UNITED STATES PATENTS

| Number | Name | Date |
| --- | --- | --- |
| 1,667,767 | Bollmann | May 1, 1928 |
| 1,673,615 | Bollmann | June 12, 1938 |
| 1,892,366 | Sato et al. | Dec. 27, 1932 |
| 1,895,424 | Rewald | Jan. 24, 1933 |
| 2,377,975 | Singer et al. | June 12, 1945 |